United States Patent [19]

Mathes

[11] 3,969,825
[45] July 20, 1976

[54] ARCHER'S BOW SQUARE FOR LOCATING ARROW NOCKING POINT POSITION

[76] Inventor: Larry W. Mathes, Rte. 5, Corydon, Ind. 47112

[22] Filed: Apr. 28, 1975

[21] Appl. No.: 571,981

[52] U.S. Cl. .............................. 33/180 R; 124/24 R
[51] Int. Cl.² .......................................... G01B 3/30
[58] Field of Search ................ 33/180 R, 286, 46 A; 124/24 R, 30 R, 30 A, 41 A, 1, 23 R, 35 A

[56] References Cited
UNITED STATES PATENTS

| | | | |
|---|---|---|---|
| 1,542,159 | 6/1925 | Maxwell | 124/35 A |
| 3,600,814 | 8/1971 | Smith | 33/180 R |
| 3,651,578 | 3/1972 | Saunders et al. | 33/286 X |

*Primary Examiner*—Richard C. Pinkham
*Assistant Examiner*—William R. Browne
*Attorney, Agent, or Firm*—Maurice L. Miller, Jr.

[57] ABSTRACT

A bow square device of generally question mark shape, has a relatively flat body and has a channel therein whose center lies approximately within the plane containing the body. The channel defined by the body is adapted to confine the shaft of bow supported arrow therein. Spring chips are detachably mounted on each end of the body for detachably and slidably attaching the device to strung a bow string. The body may be slid along a strung bow string, while confining a bow supported arrow, so that when the shaft of the arrow is approximately perpendicular to the strung bow string, the pointed end of the arrow, which is confined by the device, will indicate the proper nocking point on the strung bow string. The portion of the body adapted to confine the bow supported arrow shaft is spaced from the strung bow string, thus enabling the arrow itself to be moved toward a strung bow string to enable the point of the arrow to locate the nocking point on the strung bow string.

9 Claims, 6 Drawing Figures

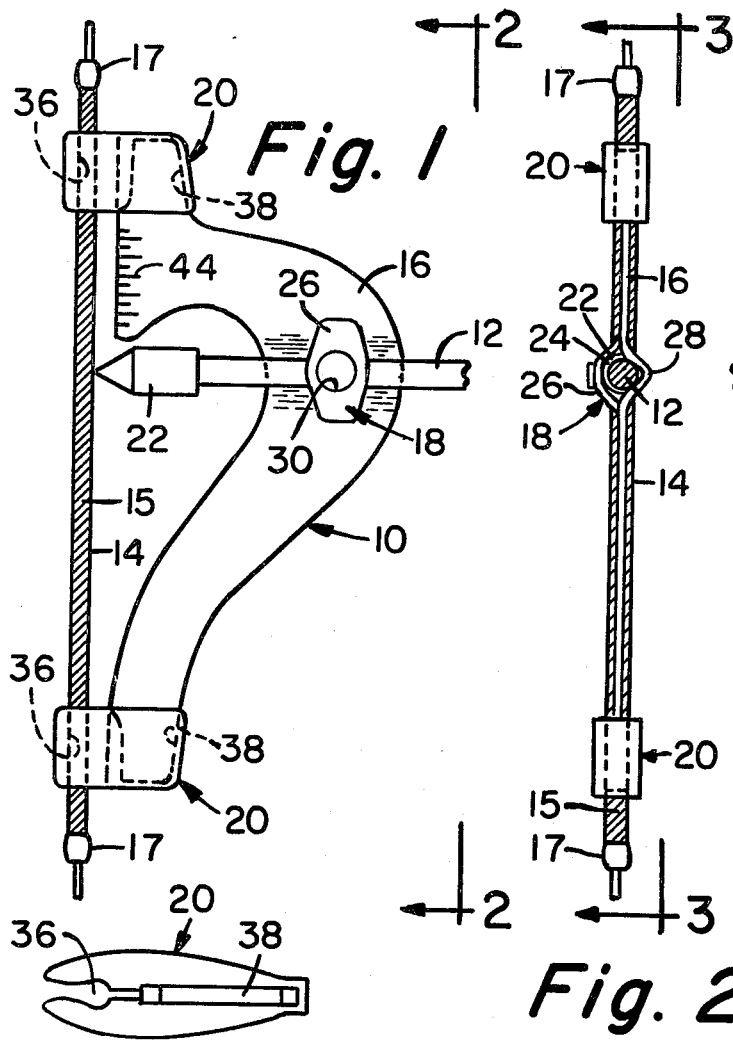
Fig. 1  Fig. 2  Fig. 3
Fig. 4
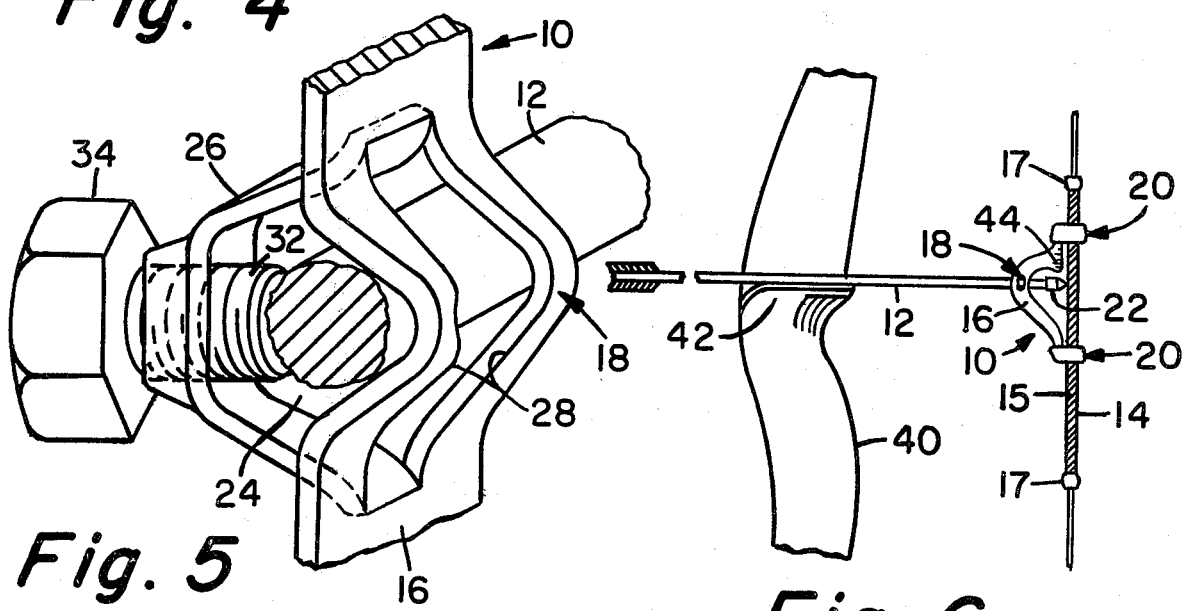
Fig. 5
Fig. 6

ARCHER'S BOW SQUARE FOR LOCATING ARROW NOCKING POINT POSITION

BACKGROUND OF THE INVENTION

This invention relates to archery bows and more particularly to a device for locating the position of the nocking point on a bow string.

The nocking point is a preselected and identifiable position on an archer's bow string against which an arrow is placed so as to propel the same accurately and consistently every time the arrow is fired. It is highly important that the precise position of the nocking point be located for each arrow to be fired from the bow. Moreover, different arrows, particularly those having different diameters, have slightly different nocking point positions on the bow string of a given bow.

There are a number of nocking point bow squares known in the prior art such as, for example, those disclosed in U.S. Pat. No. 3,651,578 issued to T. A. Saunders, et al., on Mar. 28, 1972, U.S. Pat. No. 3,088,212 issued to G. E. Smith on May 7, 1963 and U.S. Pat. No. 3,038,262 issued to A. G. Fuehrer, et al., on June 12, 1962. These prior art devices are all characterized by generally T-shaped construction having a scaled crossbar which attaches by means of clips to the bow string and a scaled transverse bar which extends between the bow string and the bow. During use, the free end of the transverse bar rests upon the arrow rest of the bow handle. The nocking point is located on the bow string with the aid of the calibrated scale on the cross-bar.

A difficulty encountered in using these prior art devices is that they are not adapted to utilize the arrow itself to locate the precise nocking point for the particular arrow to be fired. Accordingly a slight but material inaccuracy in locating the proper nocking point for a given arrow may result. By means of my invention this difficulty is substantially overcome.

SUMMARY OF THE INVENTION

It is an object of the instant invention to provide an archer's bow square for accurately locating the nocking point on a bow string for a given arrow.

It is a further object of the instant invention to provide an archer's bow square for locating the arrow nocking point on a bow string which utilizes the arrow itself in locating such point.

Briefly, in accordance with the instant invention, there is provided an archer's bow square for locating the nocking point of an arrow on a bow string having means for confining the shaft of the arrow therein, spaced from the bow string. Means is also provided for slidably attaching the confining means to the bow string.

These and other objects of the instant invention will become apparent to those skilled in the art for the following detailed description and attached drawings, on which by way of example, only the preferred embodiments of the instant invention are illustrated.

BRIEF DESCRIPTION OF THE DRAWINGS

FIG. 1 shows a broadside elevation view of an archer's bow square illustrating one preferred embodiment of the instant invention.

FIG. 2 shows an end elevation view of the archer's bow square of FIG. 1 as viewed along lines 2—2 of the latter figure.

FIG. 3 shows another broadside elevation view of the archer's bow square of FIGS. 1 and 2 as viewed along lines 3—3 of FIG. 2.

FIG. 4 shows a plan view of one of the detachable bow string clips used in connection with the archer's bow square of FIG. 1.

FIG. 5 is a perspective view of a portion of the archer's bow square of FIGS. 1, 2 and 3 emphasizing the arrow shaft guide thereof with thumb screw attached.

FIG. 6 is a side elevation view of a portion of an archer's bow showing the archer's bow square of FIGS. 1–3 and 5 attached to the bow string, for locating the nocking point of an arrow.

DESCRIPTION OF THE PREFERRED EMBODIMENT

Referring now to FIGS. 1–3 and 5–6, there is shown an archer's bow square 10 adapted for accurately locating the nocking point of an arrow 12 on a bow string 14. The bow square 10 includes a relatively flat question mark shaped body 16, an arrow shaft confining means 18, and a pair of spring clips 20. The body may be constructed of any suitable relatively rigid material such as, for example, plastic, metal or the like. The confining means 18 may be formed as shown, and attached in any suitable manner to the body 16 so as to permit the arrow shaft 12 and its' larger diameter tip 22 to pass through and be confined within a channel 24 approximately centered in the plane containing the broad surface of the body 16.

Where the body 16 is formed of metal, it is readily possible to form the means 18 as an integral part of the body 16 by cutting or scribing out a central member 26, and pressing, stamping or otherwise bending the same outwardly from the plane of the body 16 in any well-known manner. The resulting sides 28, either side of the member 26, may be likewise bent outwardly away from the plane of the body 16, in a direction opposite the member 26, thus forming the central channel 24. A threaded hole 30 may be provided in the center of a member 26 so that a suitable threaded fastener such as, for example, a thumb screw 32 with a knob 34 attached, can be employed to secure the arrow shaft 12 within the channel 24 against the sides 28 (See FIG. 5).

As additional feature of the instant invention is the detachable pair of spring clips 20 shown in FIGS. 1–3, 4 and 6. The clips 20 may be formed of any suitable material such as, for example, metal or plastic, and are conveniently removable from the body 16 when the bow square 10 is not in use. As shown in FIGS. 1, 3 and 4, each of the clips 20 define a bow string confining channel 36 and a slot 38 adapted to receive and conform to the ends of the body 16. As an alternative arrangement, any suitable and well-known type of bow string clip or clamp may be used to secure the body 16 to the bow string 14, including those which are permanently attached to the end portions of the body 16.

Another feature of the instant invention is obtained by forming the body 16 in such a manner as to make the vertical spacing between the confining means 18 and the top spring clip 20 substantially less than between the confining means 18 and the bottom spring clip 20. The "question mark" shape of the body 16 of the instant example of the invention provides this feature.

Ordinarily, archer's bow strings are composed of several strands of string wound in a tight spiral. However, through wear and continued use, the strands tend to become loose and unraveled. To avoid this problem the central portion of the bow string 14 is usually wrapped with a closely spaced twine 15 as seen in FIGS. 1–3, called the "serving." The top and bottom ends of the twine 15 are then secured with a cloth or tape fabric to form a joint 17. The joint 17 produces a bulge or a swollen segment on the bow string 12 and the top joint 17 could easily be used by an archer as a sight.

However, the use of the top joint 17 as a sight is illegal in some forms of archery competition and in such cases the top joint 17 is required to be substantially below the eye level of the archer, nearer to the arrow nock than the bottom joint 17. This requirement often places the top joint 17 so near to the arrow nock that the top spring clip or fastener used on the conventional bow checking device fastens to the bow string either on, or partially on, the swollen joint 17. This produces a slight tilt in the bow checking device which results in an error in locating the proper arrow nocking point.

By using the offset feature of the instant example, the upper spring clip 20 attaches to the bow string 12 well below the swollen joint 17 so that such a tilt in the bow square 10 is eliminated during the arrow alignment procedure. This is generally the case even where the top joint 17 is lowered substantially below the line of sight of the archer as required in some forms of competition.

Referring now to FIG. 6, the typical application and use of the instant invention is illustrated. There is shown a conventional archer's bow 40 having an arrow rest 42. The bow square 10 is attached by means of the clips 20 to the bow string 14 approximately opposite the arrow rest 42. The arrow 12 and its' tip 22 is inserted through the channel 24 (See FIG. 2 and 5) of the confining means 18. The rear portion of the arrow shaft 12 is placed upon the arrow rest 42 of the bow 40 and the tip 22 is urged, with the hand, into contact with the string 14. Next, the bow square 10 is carefully adjusted by sliding the same up or down along the bow string 14 until the arrow shaft 12 is precisely balanced upon the arrow rest 42 in the preferred firing position. A marker may be used to establish the proper nocking point for the arrow 12 on the bow string 14 opposite the tip 22. On the upper end portion of the body 16, a calibrated scale 44 (See FIGS. 1, 3 and 6) may be formed parallel to the bow string 14 between the centerline of the channel 24 and the upper end of the body 16. The scale 44 may be used to align the upper or lower limit of the nocking point of the arrow 12 against the string 14.

Although the instant invention has been described with respect to specific details of a certain preferred embodiment thereof, it is not intended that such details limit the instant invention, except insofar as is set forth in the following claims.

I claim:

1. An archer's bow square comprising
   confining means confining and for guiding a pointed end of a bow supported arrow when the latter is moved toward and against a string bow string so that a pointed end of an arrow will indicate a position on a strung bow string for a nocking point, said confining means being spaced from a strung bow string, and
   means for detachably and slidably attaching said confining means to a strung bow string, so that a pointed end of a bow supported arrow may be adjusted to a position approximately perpendicular to a strung bow string for locating a nocking point.

2. The archer's bow square of claim 1 wherein said attaching means comprises spring clips attached to end portions of said confining means.

3. The archer's bow square of the claim 2 wherein said spring clips are detachable from said confining means.

4. The archer's bow square of claim 1 wherein said confining means comprises
   a relatively flat body, and
   means connected to said body forming a channel generally centered in the plane containing said body and adapted to confine an arrow therein.

5. The archer's bow square of claim 4 wherein said body is generally question mark shaped.

6. The archer's bow square of claim 5 further comprising a calibrated scale disposed parallel to a strung bow string between the center line of said channel and one end of said body.

7. The archer's bow square of claim 4 wherein said channel forming means is integrally formed on said body and comprises
   a first side member fashioned outwardly from a central portion of one broadside of said body, and
   a pair of side members on the other side of said body fashioned outwardly from the plane of said body, opposite the direction in which said first side member is fashioned, to form a channel for confining an arrow therein.

8. The archer's bow square of claim 7 further comprising
   a threaded hole defined by said first side member, and
   a threaded fastener conforming to said hole and adapted to secure an arrow against said pair of side members in said channel.

9. The archer's bow square of claim 1 wherein said square has one said attaching means at each end thereof, said confining means is offset in distance from and positioned between said plurality attaching means.

* * * * *